United States Patent Office 3,404,755
Patented Oct. 8, 1968

3,404,755
ADJUSTABLE ACTUATING MEANS FOR DISC BRAKES
William Ernest Keatley and Roger White Silvera, Coventry, England, assignors to Dunlop Rubber Company Limited, London, England, a corporation of Great Britain
Filed Sept. 10, 1965, Ser. No. 486,322
Claims priority, application Great Britain, Sept. 23, 1964, 38,730/64
5 Claims. (Cl. 188—73)

ABSTRACT OF THE DISCLOSURE

The invention relates to a disc brake structure. Friction pads are mounted on guide means to engage a disc on opposite sides thereof. Actuating means for the pads includes relatively rotatable cam-ball means mounted on a rod member adjacent one of said pads, said rod member engaging the other pad to transmit braking forces thereto. An adjusting means associated with said rod repositions the actuator upon wear of the pads.

---

This invention relates to disc brakes, and particularly to disc brakes suitable for heavy-duty applications.

One object of the invention is to provide a disc brake for heavy vehicles which comprises a mechanical operating mechanism suitable for actuation by a conventional pneumatic or hydraulic braking system.

According to the invention a disc brake comprises an annular disc drivably secured at its outer periphery to a rotatable spider, a pair of friction elements arranged in axially aligned positions one on each side of the disc, each friction element being axially slidably supported on a pair of pins located in spaced-apart positions adjacent the inner periphery of the disc, the pins being mounted on a non-rotatable support and aligned parallel to the axis of the disc, a tie rod having one end associated with a first friction element on one side of the disc and extending axially adjacent the inner periphery of the disc, and a brake operating mechanism for drawing the friction elements towards one another to apply the brake, the brake operating mechanism being associated with the tie rod and with a second friction element on the opposite side of the disc and comprising a ball-and-ramp expander mechanism.

One embodiment of the invention will now be described, with reference to the accompanying drawings, in which.

Figure 1:
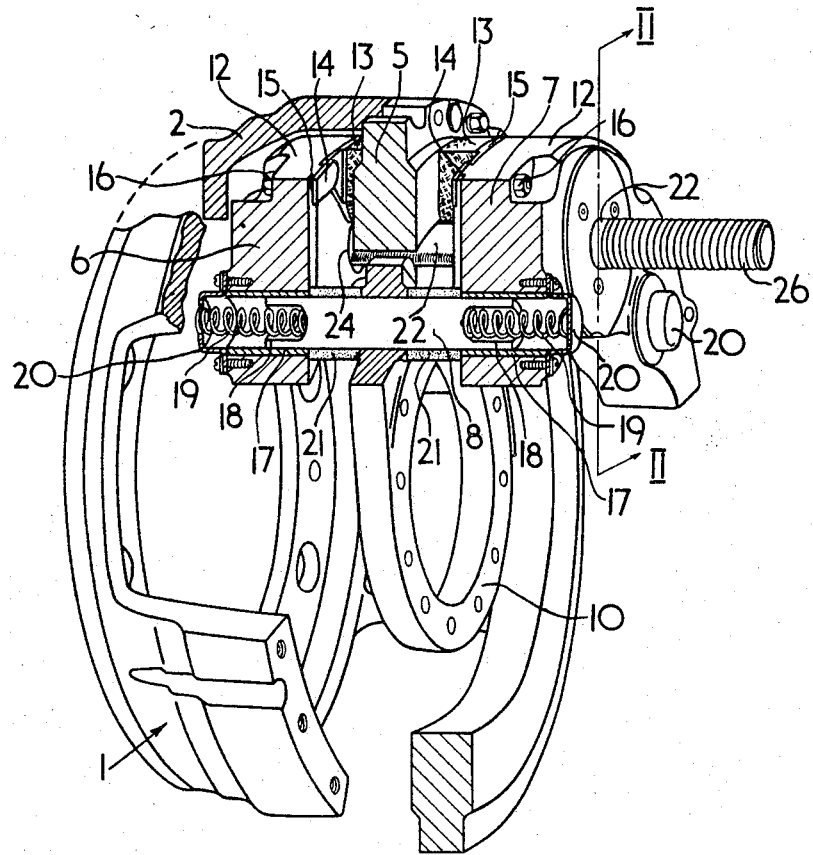
FIGURE 1 is a diagrammatic perspective view partly in cross-section, of part of a disc brake.

The disc brake 1 shown in the drawings comprises a spider 2 arranged to be rigidly secured to a vehicle wheel 3 and rotatable therewith about an axle 4. An annular disc 5 is secured at its outer periphery to the spider 2.

A first friction element 6 and a second friction element 7 are mounted on opposite sides of the disc 5 and are axially slidable towards one another on a pair of spaced-apart pins 8 and 9 which extend parallel to the axis of the disc and adjacent its inner periphery. The pins 8 and 9 are mounted in a non-rotatable support 10 bolted to a flange 11 which is welded to the axle 4. The friction elements 6 and 7 each comprise a pressure plate 12 of part-annular form, viewed in the axial direction of the disc, to which three friction pad assemblies 13 are detachably secured by the heads of bolts 14 which engage backing plates 15 of the pad assemblies to hold them in position on the pressure plate 12. The bolts 14 are fastened to the pressure plate 12 by nuts 16 and can be removed to release the friction pad assemblies, which can then be withdrawn in a radial direction, the pad assemblies of the friction element 6 being removable through one of the gaps formed in the spider.

The pressure plates 12 are each provided with a pair of bushes 17 which are slidable on the pins 8, 9 to guide the pressure plates axially with respect to the disc, and the ends of each pin are bored to provide sockets 18 in which retraction springs 19 are located. The retraction springs 19 press against caps 20 secured to the pressure plates and act to urge the pressure plates away from the disc. An additional pair of retraction springs (not illustrated) is provided, the additional springs being coiled compression springs disposed axially adjacent the inner periphery of the disc, opposite ends of the springs being located in sockets formed in the pressure plates. Gaiters 21 are provided to exclude dirt from the sliding surfaces of the pins and bushes, the gaiters 21 being made from easily compressible material such as sponge rubber.

A tie rod 22 is disposed parallel to the axis of the disc and adjacent the inner periphery thereof, the rod 22 having a head 23 engaging the pressure plate of the friction element 6, and extending through axially aligned holes 24 and 25 formed respectively in the friction elements 6 and 7. The rod 22 has a screw-threaded portion 26 which is associated with a ball-and-ramp expander mechanism 27 (not shown in FIGURE 1) which constitutes a brake operating mechanism for drawing the friction elements 6 and 7 towards one another to grip the disc 5.

The expander mechanism 27 comprises a first thrust member in the form of a plate 28, a second thrust member in the form of a plate 29, and three balls 30 (only one of which is shown) located in ramped recesses 31, 32 in the members 28 and 29 respectively and symmetrically spaced around the axis of the tie rod 22. A plate 33 acts as a cage for retaining the balls in position.

The thrust plate 29 is rigidly secured to the pressure plate 12 of the friction element 7 together with a retaining member in the form of a sleeve 34, also non-rotatably secured to the pressure plate and coaxially surrounding the tie rod 22. The thrust plate 28 is rotatably mounted on the sleeve 34 and is drivably engaged by a hollow shaft 35 which grips the outer periphery of the plate 28 and extends coaxially with respect to the tie rod 22 to provide means for conveying brake-applying torque to the plate 28. The shaft 35 is rotatably and axially slidably supported in a bearing 36 secured to the axle 4 and is provided with internal splines 37 to enable it to be rotated by an actuating shaft 38 which is itself rotatable by any convenient brake actuating system, such as a pneumatically operated thrust device mounted on the axle 4 and coupled to the shaft by a lever. A pair of gaiters 39, 40 are provided to exclude dirt from the sliding surfaces of the shaft 35 and bearing 36.

The expander mechanism 27 includes a reaction member 41 which is non-rotatably but axially movably splined to the sleeve 34, and is supported by an adjustment member 42 against the axial brake-applying thrust developed in the expander mechanism. The adjustment member 42 is in the form of a nut screwed on to the threaded portion 26 of the tie rod 22, the screw threads of the portion 26 and the member 42 being left-hand, so that anti-clockwise rotation of the member 42, viewed from the right-hand side of FIGURE 2, draws the tie rod through the member 42 to take up any play which may develop as a result of a friction pad wear.

The reaction member 41 is provided with a needle roller bearing 43 on one side, to engage the thrust plate 28 and to permit the thrust plate to rotate, and an annular friction disc 44 on its other side for engagement with the adjustment member 42. A cover plate 45 is secured by bolts 46 to the shaft 35 and is removable to allow the adjustment member 42 to be rotated manually, a series of sockets 47 being provided around the circumference of the member 42 for engagement by a tool to rotate the member.

An automatic adjustment device for the member 42 comprises a coiled clutch spring 48 which fits tightly around a cylindrical portion 49 of the member 42. One end of the spring 48 is free and the other end 50 is turned radially outwardly so as to be engageable with a slot 51 formed in an inwardly projecting portion 52 of the cover plate 45. The spring 48 is wound in a direction such that when the end 50 of the spring is rotated in a clockwise direction, viewed from the right-hand side of FIGURE 2, the spring is loosened and can be turned freely, while if the end 50 is rotated in an anti-clockwise direction the spring tightens on the portion 49 of the member 42 and tends to rotate the member 42.

Figure 2:
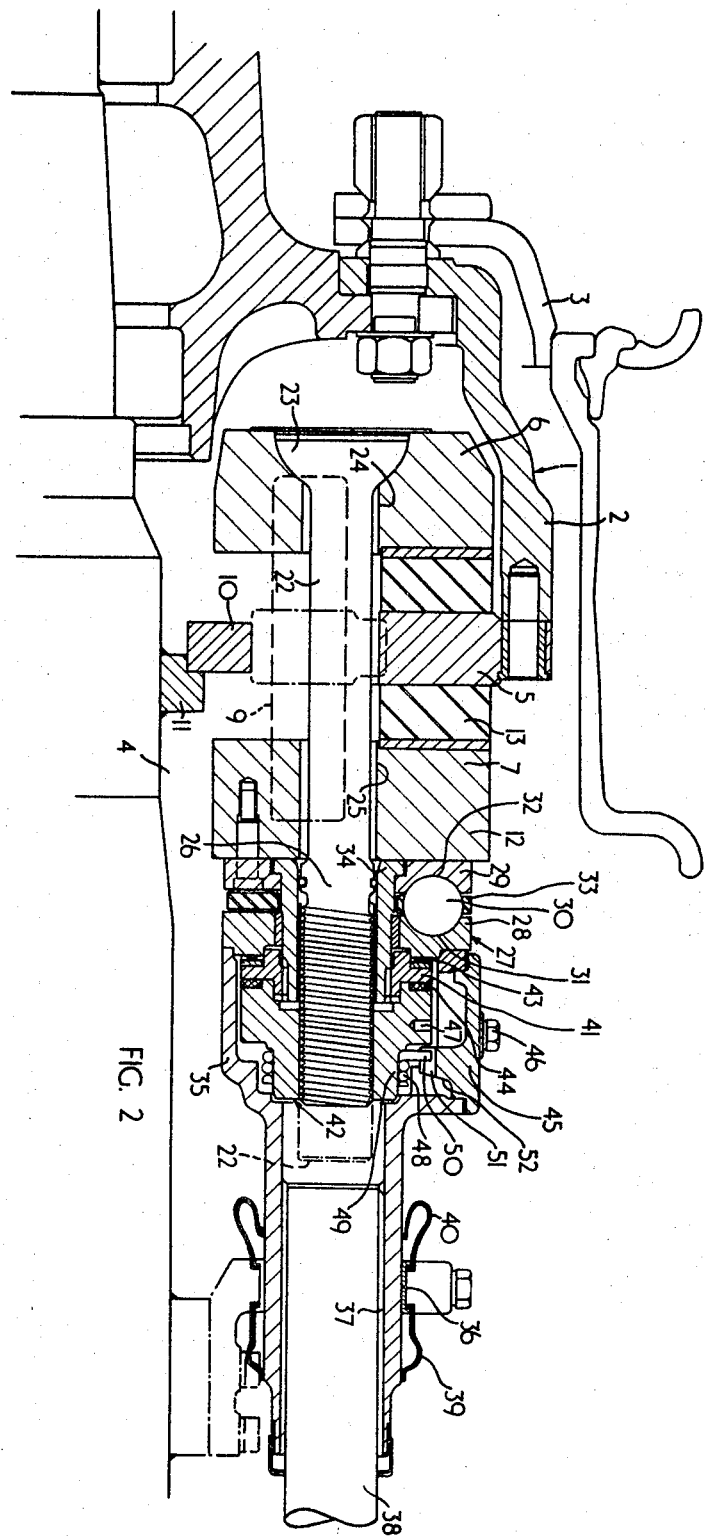
FIGURE 2 is an axial cross-sectional view of part of the brake shown in FIGURE 1, the cross-section being taken on the line II—II of FIGURE 1, together with part of an associated axle and wheel assembly.

In operation, the brake is applied by a clockwise rotation of the shaft 35 as viewed from the right-hand side of FIGURE 2. The thrust plate 28 rotates with the shaft 35 and the relative rotation of the plates 28 and 29 causes the balls 30 to ride up the ramped sides of their recesses 31 and 32, forcing the plates apart. This applies a thrust directly to the friction element 7 and also to the friction element 6 through the reaction member 41, adjustment member 42 and tie rod 22.

On application of the brake, the adjustment member 42 is prevented from rotating by the friction ring 44, which is compressed by the brake-applying thrust between opposed faces of the reaction member 41 and the adjustment member 42. Since the reaction member 41 is prevented from rotating by its splined connection to the nonrotatable sleeve 34 the adjustment member is in effect locked against rotation by its frictional engagement with the ring 44 and the frictional engagement between the ring 44 and the reaction member 41. The provision of the needle roller bearing 43 between the opposed faces of the reaction member 41 and the thrust plate 28 ensures that the thrust plate is not prevented from rotating by the increased friction as the brake-applying thrust is developed.

The slot 51, in which the end 50 of the spring 48 is engageable, is of sufficient width to enable the brake to be applied and released without moving the end 50, provided that no friction pad wear occurs. If friction pad wear occurs while the brake is applied, the shaft 35 will rotate through an increased angle, and one end face of the slot 51 will contact the end 50 of the spring 48. The spring 48 will then be rotated with the shaft 35, and will slip on the surface of the cylindrical portion 49 of the adjustment member 42 to take up a new position thereon. On release of the brake, the shafts 38 and 35 are returned by a spring (not shown) to their original angular position. The opposite end face of the slot 51 will then contact the end 50 of the spring 48 and will rotate the spring in the anti-clockwise direction as viewed from the right-hand side of the drawing. The spring 48 grips the surface of the portion 49 during anti-clockwise movement and will turn the adjustment member 42 in the said anticlockwise direction, drawing the tie rod 22 to the right and thus taking up any clearance which has arisen as a result of friction pad wear. The friction ring 44 does not prevent rotation of the adjustment member 42 when the brake is released, since the brake-applying thrust no longer acts to compress the friction ring 44 against the opposed faces of the reaction member 41 and the adjustment member 42.

The final position of the tie rod 22, when the friction pads are fully worn, is indicated in dotted lines in FIGURE 2. It will be noted that the shaft 35 and brake-applying mechanism 27 will move through an equal distance towards the disc as the tie rod moves towards the position shown in dotted lines.

While in the embodiment described above an automatic adjustment device is provided, the adjustment member may alternatively be provided with a manually releasable locking device, such as a plunger mounted on the reaction member and engageable with serrations or indentations formed around the periphery of the adjustment member. Adjustment would then be effected by removing the cover plate, releasing the plunger, rotating the adjusting member to take up play, and replacing the plunger.

In the embodiment described above the rotatable thrust plate is rotated by means of a hollow axially-extending shaft splined to a fixed actuating shaft, and the brake can thus be actuated by a conventional thrust device mounted in a fixed position on the axle. While this arrangement is advantageous for incorporating the brake into an existing brake operating system on a vehicle, it is also possible to attach a lever directly to the rotatable thrust plate to operate the brake.

The brake described above is compact, easily maintained and efficient in operation. It is particularly suitable for heavy duty applications where an exceptionally robust mechanically-operated disc brake is required.

Having now described our invention, what we claim is:

1. A disc brake comprising an annular disc drivably secured at its outer periphery to a rotatable support, a pair of friction elements arranged in axially aligned positions one on each side of the disc, a pair of pins located in spaced apart positions adjacent the inner periphery of said disc and providing axial, slidable support for said friction elements, said pins being mounted on a nonrotatable support and aligned parallel to the axis of the disc, a tie-rod having one end associated with a first friction element on one side of the disc and extending axially adjacent the inner periphery of the disc, a brake operating mechanism for drawing the friction elements toward one another to apply the brake, said brake operating mechanism being disposed with the tie-rod and the second friction element on the opposite side of the disc, and including a ball-and-ramp expander mechanism which comprises a first thrust member associated with the tie-rod and a second thrust member nonrotatably associated with the second friction element, said thrust members having a plurality of pairs of ramped recesses therebetween and balls located in said pairs of ramped recesses, said first thrust member being rotatable relative to second thrust member in one direction to cause the balls to ride up the ramps of the recesses and thus to move the thrust members axially apart to apply the brake and in the other direction to release the brake, a reaction member for supporting said first thrust member against the axial brake-applying thrust developed by said expander mechanism, an adjustment member in screw-threaded engagement with said tie-rod to support said reaction member against the thrust, retaining means for holding said adjustment member in position on its associated tie-rod during application of the brake and having a retaining member fixed to said second thrust member and engaging the reaction member to prevent rotation thereof, means for preventing said adjustment member from rotating relatively to the reaction member during application of the brake, said second thrust member being in the form of a thrust plate rigidly attached to the second friction element and coaxially surrounding the tie rod, the first thrust member also being in the form of a thrust plate coaxially surrounding the tie rod, the retaining member being in the form of a sleeve nonrotatably secured to the second friction element and coaxially surrounding the tie rod, and the reaction member being nonrotatably mounted on the retaining member.

2. A disc brake according to claim 1 wherein friction means is provided for preventing rotation of the adjustment member relative to the reaction member on application of the brake.

3. A disc brake according to claim 1 wherein a hollow shaft is secured to the first thrust member and extends coaxially with respect to the tie rod in a direction away from the disc to provide means for conveying brake-applying torque to the first thrust member.

4. A disc brake according to claim 3 wherein the end of the hollow shaft remote from the disc is splined to an actuating shaft.

5. A disc brake according to claim 3 wherein the hollow shaft comprises a detachable cover plate adjacent the adjustment member to facilitate manual adjustment thereof.

References Cited

UNITED STATES PATENTS

| | | | |
|---|---|---|---|
| 2,612,969 | 10/1952 | Hawley | 188—72 |
| 2,835,350 | 5/1958 | Butler | 188—73 |
| 3,115,217 | 12/1963 | Butler | 188—72 |
| 3,155,195 | 11/1964 | Brawerman | 188—73 |
| 3,211,263 | 10/1965 | Harrison | 188—196 |

FOREIGN PATENTS

| | | |
|---|---|---|
| 1,340,290 | 9/1963 | France. |
| 631,880 | 11/1949 | Great Britain. |
| 618,037 | 2/1961 | Italy. |

MILTON BUCHLER, *Primary Examiner.*

G. E. HALVOSA, *Assistant Examiner.*